(12) United States Patent
Park

(10) Patent No.: US 10,495,009 B2
(45) Date of Patent: Dec. 3, 2019

(54) APPARATUS AND METHOD FOR CONTROLLING OPERATION OF ENGINE

(71) Applicants: HYUNDAI MOTOR COMPANY, Seoul (KR); KIA MOTORS CORPORATION, Seoul (KR)

(72) Inventor: Il Kwon Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 63 days.

(21) Appl. No.: 15/995,649

(22) Filed: Jun. 1, 2018

(65) Prior Publication Data
US 2019/0211758 A1   Jul. 11, 2019

(30) Foreign Application Priority Data
Jan. 11, 2018   (KR) .......................... 10-2018-0003806

(51) Int. Cl.
| | |
|---|---|
| *F02D 25/02* | (2006.01) |
| *B60W 10/02* | (2006.01) |
| *F02D 41/06* | (2006.01) |
| *B60K 6/38* | (2007.10) |
| *B60W 20/40* | (2016.01) |
| *B60K 6/48* | (2007.10) |

(52) U.S. Cl.
CPC ................ *F02D 25/02* (2013.01); *B60K 6/38* (2013.01); *B60W 10/02* (2013.01); *B60W 20/40* (2013.01); *F02D 41/061* (2013.01); *B60K 2006/4825* (2013.01); *B60W 2510/0638* (2013.01); *B60W 2710/0644* (2013.01); *Y10S 903/902* (2013.01)

(58) Field of Classification Search
CPC ...... F02D 25/02; F02D 41/061; B60W 10/02; B60W 20/40; B60W 2510/0638; B60W 2710/0644; B60K 6/38; B60K 2006/4825; Y10S 903/902
USPC .................... 60/706, 711, 716, 718; 701/22; 180/65.275; 903/902
See application file for complete search history.

(56) References Cited

U.S. PATENT DOCUMENTS

| | | | |
|---|---|---|---|
| 2012/0309586 A1* | 12/2012 | Jeong ..................... | B60K 6/442 477/5 |
| 2013/0038271 A1* | 2/2013 | Park ........................ | B60K 6/28 320/104 |
| 2014/0163790 A1* | 6/2014 | Kim ...................... | B60W 20/40 701/22 |

(Continued)

*Primary Examiner* — Hoang M Nguyen

(74) *Attorney, Agent, or Firm* — Morgan, Lewis & Bockius LLP

(57) ABSTRACT

An engine operation control apparatus includes a controller configured to: decide an engine operation time point based on a lookup table in which a learning value that is previously learned is stored when a request to switch to an HEV mode occurs; determine whether to engage an engine clutch by comparing an engine RPM when a speed of an engine is synchronized with a speed of a motor with a first motor RPM; operate the engine at the engine operation time point and control engagement of the engine clutch depending on the determination; and store the engine operation time point based on a second motor RPM at a synchronization completion time point when a learning condition of the engine operation time point is satisfied when the speed of the engine and the motor are synchronized.

20 Claims, 12 Drawing Sheets

(56) References Cited

U.S. PATENT DOCUMENTS

| | | | | |
|---|---|---|---|---|
| 2014/0297073 A1* | 10/2014 | Jeong | ................... | B60W 20/40 |
| | | | | 701/22 |
| 2015/0210268 A1* | 7/2015 | Yang | ..................... | B60K 6/387 |
| | | | | 74/661 |
| 2018/0170356 A1* | 6/2018 | Lee | ....................... | B60K 6/442 |

* cited by examiner

| FTP FUEL MODE ||
|---|---|
| TOTAL ENGINE IDLING TIME WHEN ENGINE CLUTCH IS ENGAGED | TOTAL FUEL CONSUMPTION AMOUNT IN ENGINE IDLING SECTION |
| 6.3sec | 3.9mL |

FIG.5B

| FTP FUEL MODE |||
|---|---|---|
| TOTAL ENGINE IDLING TIME WHEN ENGINE CLUTCH IS ENGAGED | TOTAL FUEL CONSUMPTION AMOUNT IN ENGINE IDLING SECTION | FUEL EFFICIENCY INCREASE RATE |
| 4.1sec(2sec↓) | 2.6mL(1.3mL↓) | 0.15%↑ |

FIG.6B

APPARATUS AND METHOD FOR CONTROLLING OPERATION OF ENGINE

CROSS-REFERENCE TO RELATED APPLICATION

This application is based on and claims the benefit of priority to Korean Patent Application No. 10-2018-0003806, filed on Jan. 11, 2018, in the Korean Intellectual Property Office, the disclosure of which is incorporated herein in its entirety by reference.

TECHNICAL FIELD

The present disclosure relates to an apparatus and a method for controlling an operation of an engine.

BACKGROUND

When an electric vehicle (EV) mode is switched to a hybrid electric vehicle (HEV) mode in a conventional eco-friendly vehicle, in order to match a time point at which a speed of an engine is synchronized with a speed of the motor to a time point at which an engine clutch engagement is available, the engine is operated before the time point at which the engine clutch engagement is available depending on a rising slope of a motor speed, i.e., a motor acceleration, by taking into account an engine operation time and a speed synchronization time of the engine and the motor.

However, the engine operation time and the speed synchronization completion time point vary depending on the vehicle and a vehicle state, and thus, it is difficult to precisely match the speed synchronization completion time point to the engine clutch engagement available time point.

In a case that the speed of the engine is synchronized with the speed of the motor before the engine clutch engagement available time point, an idling time of the engine increases.

In addition, in a case that the speed of the engine is synchronized with the speed of the motor after the engine clutch engagement available time point, the EV drive time increases.

SUMMARY

The present disclosure has been made to solve the above-mentioned problems occurring in the prior art while advantages achieved by the prior art are maintained intact.

An aspect of the present disclosure provides an apparatus and a method for controlling an operation of an engine, which are capable of minimizing an idling section of the engine and minimizing a time in which the engine operates in an electric vehicle (EV) mode while exceeding a motor revolutions per minute (RPM) at which an engagement of an engine clutch is available by determining an engine operation time point based on a learning value.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an engine operation control apparatus includes a controller configured to: decide an engine operation start time point based on a lookup table in which a determination value that is previously determined is stored when a request to switch to an HEV mode occurs; determine whether to engage an engine clutch by comparing an engine RPM when a speed of an engine operated at the engine operation start time point is synchronized with a speed of a motor with a first motor RPM at which engagement of the engine clutch is available; operate the engine at the engine operation start time point and controls engagement of the engine clutch depending on a determination result of engagement; and store the engine operation start time point based on a second motor RPM at a synchronization completion time point when a determination condition with respect to the engine operation start time point is satisfied while the speed of the engine is synchronized with the speed of the motor.

The controller determines the engine operation start time point when a first condition in which an engine coolant temperature exceeds a reference temperature (T) and a second condition in which an HSG available power exceeds a reference power (P) are satisfied.

The controller calculates a difference value between the first motor RPM and the second motor RPM, determines whether the difference value is within a reference range, and determines an RPM correction value at the engine operation start time point based on the difference value according to the determined result.

The controller determines that the difference value is within the reference range when to an absolute value of the difference value exceeds preset minimum value and is smaller than preset maximum value.

The minimum value is set based on a difference in speed control time between the engine and the motor.

The maximum value is set based on a difference in an engine start peak RPM.

The controller calls the RPM correction value at the engine operation start time point, which is stored in the lookup table, adds a value corresponding to a predetermined ratio of the difference value to the called RPM correction value, and determines a new RPM correction value.

The controller stores the determined RPM correction value in the lookup table.

The predetermined ratio is determined based on the determination value that is previously determined.

The lookup table stores the first motor RPM determined depending on a slope and an accelerator pedal sensor (APS), a first RPM correction value depending on a rate of change in the motor RPM, and a second RPM correction value corresponding to an RPM correction value determined by the controller.

The controller decides a motor RPM engine operation start time point based on the first motor RPM, the first RPM correction value, and the second RPM correction value, which are stored in the lookup table.

According to another aspect of the present disclosure, an engine operation control method includes: determining, by a controller, an engine operation start time point based on a lookup table in which a determination value that is previously determined is stored when a request to switch to an HEV mode occurs; operating, by the controller, an engine at the engine operation start time point; storing, by the controller, the engine operation start time point based on a second motor RPM at a synchronization completion time point when a determination condition with respect to the engine operation start time point is satisfied when a speed of the engine is synchronized with a speed of a motor; comparing, by the controller, an engine RPM at the time point at which the speed of the engine is synchronized with the speed of the motor with a first motor RPM at which engagement of the engine clutch is available to determine to engage the engine clutch; and controlling, by the controller, engagement of the engine clutch depending on the determination.

According to the above, since the engine operation start time point is determined based on the determination value, the engine idling section is minimized, and the time during which the engine operates in the EV mode while exceeding the motor RPM at which the engagement of the engine clutch is available is minimized. Accordingly, the fuel efficiency enhances.

BRIEF DESCRIPTION OF THE DRAWINGS

The above and other objects, features and advantages of the present disclosure will be more apparent from the following detailed description taken in conjunction with the accompanying drawings:

FIGS. 3, 4A, 4B, 5A, 5B, 6A, and 6B are views illustrating an operation of an engine operation control apparatus according to an exemplary embodiment of the present disclosure;

DETAILED DESCRIPTION

Figure 1:
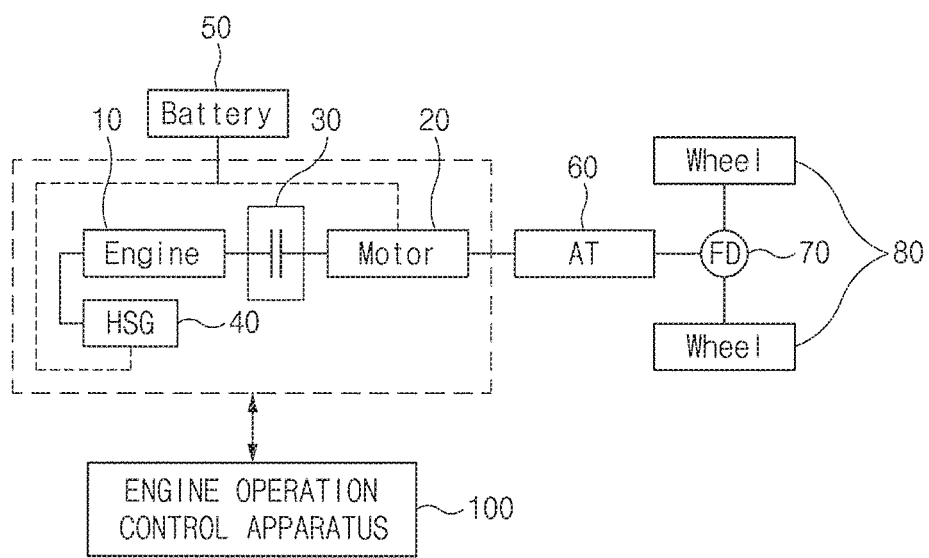
FIG. 1 is a view illustrating a vehicle system to which an engine operation control apparatus is applied according to an exemplary embodiment of the present disclosure.

Hereinafter, exemplary embodiments of the present disclosure will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present disclosure.

In describing elements of exemplary embodiments of the present disclosure, the terms $1^{st}$, $2^{nd}$, first, second, A, B, (a), (b), and the like may be used herein. These terms are only used to distinguish one element from another element but do not limit the corresponding elements irrespective of the order or priority of the corresponding elements. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a view illustrating a vehicle system to which an engine operation control apparatus 100 is applied according to an exemplary embodiment of the present disclosure.

Referring to FIG. 1, the vehicle system includes driving devices, such as an engine 10, a motor 20, an engine clutch 30, a hybrid starter generator (HSG) 40, a battery 50, an automatic transmission (AT) 60, a front wheel drive (FD) 70, a wheel 80, etc., and includes the engine operation control apparatus 100 that determines and controls an engagement of the engine clutch 30 between the engine 10 and the motor 20 and an engine operation time point.

The engine operation control apparatus 100 calculates a difference value between a revolutions per minute (RPM) of a time point at which a speed of the engine 10 and a speed of the motor 20 are synchronized with each other and an RPM of a time point at which an engagement of the engine clutch 30 is available with respect to the engine operation time point and determines a correction value of the engine operation time point from the calculated different value. In this case, the engine operation control apparatus 100 determines the engine operation time point based on the determined correction value when the engine operates next time and operates the engine 10 at the determined engine operation time point, and thus, the difference value between the RPM of the time point at which the speed of the engine 10 and the speed of the motor 20 are synchronized with each other and the RPM of the time point at which the engagement of the engine clutch 30 is available may be minimized.

When the difference value between the RPM of the time point at which the speed of the engine 10 and the speed of the motor 20 are synchronized with each other and the RPM of the time point at which the engagement of the engine clutch 30 is available is minimized, a fuel consumption may be minimized, thereby increasing fuel efficiency.

The configuration of the engine operation control apparatus 100 will be described in detail with reference to FIG. 2.

The engine operation control apparatus 100 according to the present disclosure may be integrally formed with internal controllers of a vehicle or may be connected to the internal controllers of the vehicle by a connection device after being implemented in a separated apparatus.

Figure 2:
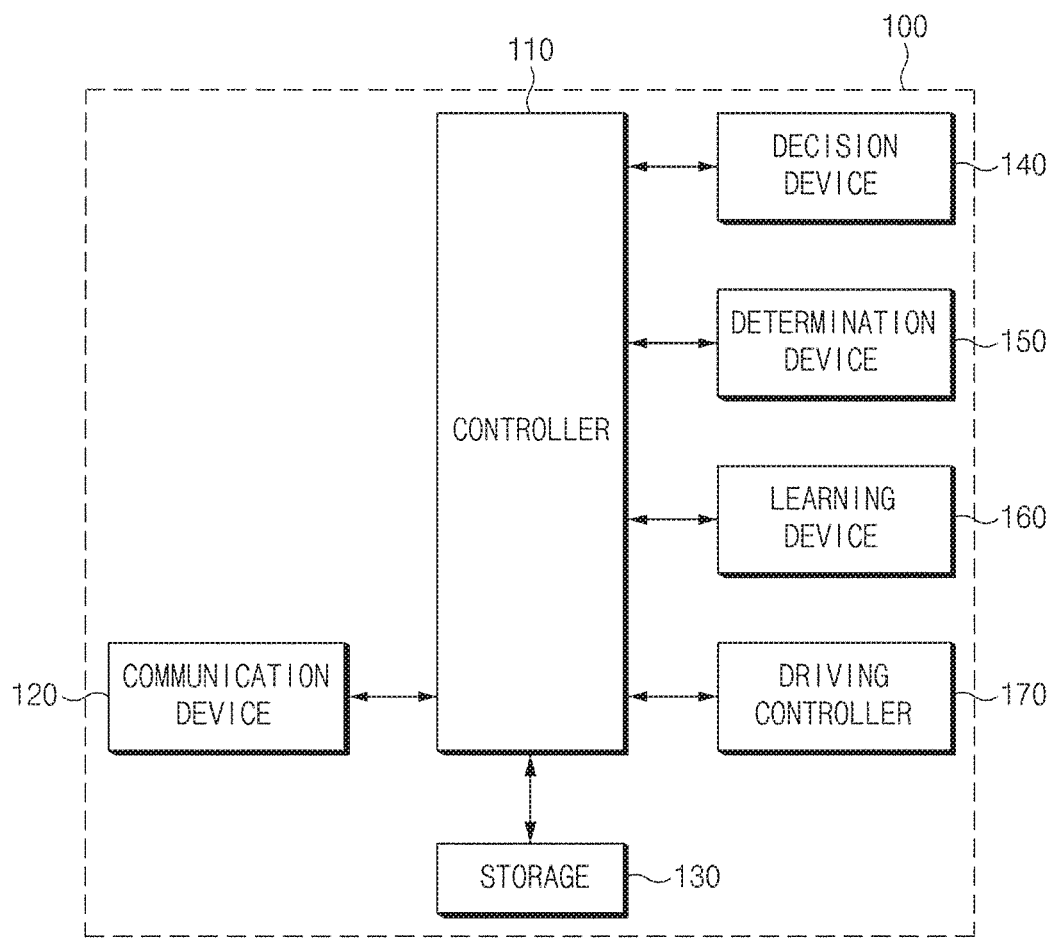
FIG. 2 is a view illustrating a configuration of an engine operation control apparatus according to an exemplary embodiment of the present disclosure.

FIG. 2 is a view illustrating a configuration of the engine operation control apparatus 100 according to an exemplary embodiment of the present disclosure.

Referring to FIG. 2, the engine operation control apparatus 100 may include a controller 110, a communication device 120, a storage 130, a decision device 140, a determination device 150, a learning device 160, and a driving controller 170. The controller 110, the decision device 140, the determination device 150, the learning device 160, and the driving controller 170 may be implemented by at least one processor.

The controller 110 may process signals applied to each component of the engine operation control apparatus 100. In the present disclosure, the controller 110 may be an electronic control unit (ECU).

The communication device 120 is a hardware device capable of transmitting an analog or digital signal over wire or wirelessly and may include one or more components that enable communication with an external device. Examples of the communication device 120 include Bluetooth devices, infrared devices, modem, network card (using Ethernet), smartphone, Wi-Fi devices (using a Wi-Fi router), etc. The communication device 120 may include a communication module that supports a communication interface with electrical equipment and/or the controllers included in the vehicle. For instance, the communication module may be communicated to the engine 10, the motor 20, the engine clutch 30, the HSG 40, and the battery 50 to receive status information of the vehicle and may transmit information to the engine 10, the motor 20, and the engine clutch 30.

The communication module may include a module supporting a vehicle network communication, such as a controller area network (CAN) communication, a local interconnect network (LIN) communication, a Flex-ray communication, etc.

The communication module may include a module for a wireless internet access or a module for a short range communication. As a wireless internet technology, a wireless LAN (WLAN), a wireless broadband (Wibro), a Wi-Fi, a world interoperability for microwave access (Wimax), and the like may be used, and a Bluetooth, a ZigBee, an ultra-wideband (UWB), a radio frequency identification (RFID), an infrared data association (IrDA), and the like may be used as a short range communication technology. In addition, the communication module may include a control circuit such as an integrated circuit (IC) chip.

The storage 130 is also a hardware device and may store data and/or algorithms required to operate the engine operation control apparatus 100.

The storage 130 may store status information about the engine 10, the motor 20, the engine clutch 30, the HSG 40, and the battery 50, which are received via the communication device 120. As an example, the storage 130 may store information, e.g., a motor RPM, an engine RPM, an engine coolant temperature, an HSG available power, etc.

In addition, the storage 130 may store a lookup table generated based on a determination value that is previously determined. The lookup table may store the motor RPM, at which the engagement of the engine clutch 30 is available, based on an accelerator pedal sensor (APS) and a slope of a road, a correction value of an engine operation RPM depending on a rate of change in the motor RPM, and a correction value of the engine operation RPM depending on the determined outcome.

In addition, the storage 130 may store condition information, instructions, and/or algorithms required to perform the learning operation of the engine operation time point.

In the present embodiment, the storage 130 may include a storage medium, such as a random access memory (RAM), a static random access memory (SRAM), a read-only memory (ROM), a programmable read-only memory (PROM), an electrically erasable programmable read-only memory (EEPROM), etc.

The decision device 140 calls the lookup table stored in the storage 130 when requested to switch to an HEV mode from an EV mode and decides an RPM R2 of the engine operation the point based on the information stored in the called lookup table.

In this case, the decision device 140 may determine the engine operation time point R2 based on the motor RPM R1 (first motor RPM) at which the engagement of the engine clutch 30 is available, the correction value of the engine operation RPM R3 (first RPM correction value) depending on the rate of change in the motor RPM, and the correction value of the engine operation RPM R5 (second RPM correction value) depending on the learning outcome, which are stored in the lookup table.

As an example, the decision device 140 may decide the engine operation time point is R2 using the following Equation 1.

$$R2 = R1 - R3 + R5 \qquad \text{Equation 1}$$

The determination device 150 determines whether the motor RPM R2 at the engine operation time point decided by the decision device 140 is smaller than a present motor RPM. When it is determined that the motor RPM R2 at the engine operation time point is smaller than the present motor RPM by the determination device 150, the driving controller 170 operates the engine 10.

In addition, the determination device 150 determines whether the speed (RPM) of the engine 10 is synchronized with the speed (RPM) of the motor 20 after the engine 10 operates. When it is determined that the speed (RPM) of the engine 10 is synchronized with the speed (RPM) of the motor 20, the determination device 150 determines whether a learning condition with respect to the engine operation time point is satisfied.

In other words, the determination device 150 determines whether a first condition in which the engine coolant temperature exceeds a reference temperature "T" is satisfied. In addition, the determination device 150 determines whether a second condition in which the HSG available power exceeds a reference power "P" is satisfied. When the first and second conditions are satisfied, the determination device 150 applies a learning start signal to the learning device 160.

In this case, the reference temperature "T", which corresponds to a coolant temperature at which there is no difference in the engine operation time, may be determined experimentally in advance. In addition, the reference power "P" may be determined to have a value obtained by adding a power for controlling the speed to an output value of the engine 10 at a time point at which the speed synchronization between the engine 10 and the motor 20 is completed.

The determination device 160 starts learning about the engine operation time point in response to the learning start signal from the determination device 150.

As a first learning step, when the learning about the engine operation time point starts, the determination device 160 detects a motor RPM R4 at the time point at which the synchronization in speed between the engine 10 and the motor 20 is completed and calculates a difference value Ra between the motor RPM R1 at which the engagement of the engine clutch 30 is available and the motor RPM R4 at the time point at which the speed synchronization between the engine 10 and the motor 20 is completed.

Here, the determination device 160 may calculate the difference value Ra by using the following Equation 2.

$$Ra = R1 - R4 \qquad \text{Equation 2}$$

A second learning step is carried out to prevent incorrect learning.

As the second learning step, the determination device 160 determines whether the difference value Ra calculated by Equation 2 is a value within a reference range. As an example, the determination device 160 determines whether the difference value Ra satisfies a range condition of Rb<|Ra|<Rc.

In the exemplary embodiment, "Rb" denotes preset minimum value, and "Rc" denotes preset maximum value.

In this case, the minimum value Rb and the maximum value Rc of the RPM are determined in advance through a vehicle test. In other words, the minimum value Rb may be set as a difference in a speed control time, which is obtained by repeatedly testing the speed control time of the engine 10 and the motor 20 with respect to the same vehicle having the same durability.

As described above, since the difference occurs in the speed control time of the engine 10 and the motor 20 with respect to the same vehicle having the same durability, there is no meaning in leaning when the difference is equal to or smaller than the minimum value Rb. Accordingly, in a case that an absolute value of the difference value Ra is equal to or smaller than the minimum value Rb, the determination device 160 terminates the learning.

In addition, the maximum value Rc may be determined as a difference between an engine start peak RPM of a new vehicle and an engine start peak RPM when breaking in the engine 10 of the new vehicle is completed.

In a case that the difference value Ra is equal to or greater than the maximum Rc, the difference value Ra is not caused by breaking in the engine 10 and the difference between vehicles. Accordingly, the determination device 160 terminates the leaning when the absolute value of the difference value Ra is equal to or greater than the maximum value Rc.

As a third learning step, the determination device 160 applies the difference value Ra calculated in the second learning step to an engine operation RPM correction value R5 that is previously learned to learn an engine operation RPM correction value R5.

Here, the determination device 160 may obtain a newly-learned engine operation RPM correction value $R5_{new}$ by adding a predetermined ratio "K" of the difference value Ra to the previously-learned engine operation RPM correction value $R5_{OLD}$ as represented by the following Equation 3.

$$R5_{NEW} = R5_{OLD} + Ra \times K \quad \text{Equation 3}$$

Figure 3:
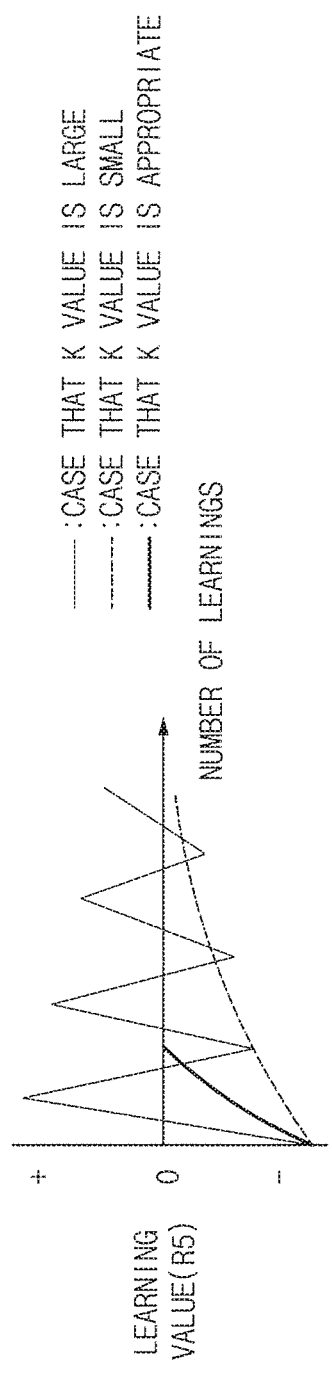

In this case, when the predetermined ratio "K" is determined to be too large, a level of the learned engine operation RPM correction value $R5_{new}$ is changed to (+) and (−) directions as shown in FIG. 3, and as a result, the incorrect learning occurs.

In addition, when the predetermined ratio "K" is determined to be too small, the number of learnings increases as shown in FIG. 3.

Accordingly, the predetermined ratio "K" may be determined to have a value that minimizes the number of the learnings within the range where the incorrect learning does not occur.

The determination device 160 stores the engine operation RPM correction value $R5_{new}$ learned in the third learning step in the lookup table. Accordingly, the learned engine operation RPM correction value $R5_{new}$ may be reflected in determining the RPM R2 at the engine operation time point when the engine 10 operates next time.

Accordingly, the decision device 140 calls the lookup table when the engine 10 operates next time and determines the motor RPM R2 at the engine operation time point based on the motor RPM R1 at which the engagement of the engine clutch 30 is available, the engine operation RPM correction value R3 depending on the rate of change in the motor RPM, and the engine operation RPM correction value $R5_{new}$ that is newly learned.

The determination device 150 compares the engine RPM with the motor RPM R1 at which the engagement of the engine clutch 30 is available during the learning of the engine operation time point.

Meanwhile, in a case that the learning condition of the engine operation time point is not satisfied after the synchronization in speed (RPM) between the engine 10 and the motor 20 is completed, the determination device 150 may compare the engine RPM with the motor RPM R1 at which the engagement of the engine clutch 30 is available.

In this case, when the engine RPM is equal to or greater than the motor RPM R1 at which the engagement of the engine clutch 30 is available, the driving controller 170 controls the engine clutch 30 to be engaged.

On the contrary, when the engine RPM is smaller than the motor RPM R1 at which the engagement of the engine clutch 30 is available, the driving controller 170 controls the engine 10 to be in an idle state until the engine RPM equals the motor RPM R1 at which the engagement of the engine clutch 30 is available.

In the various embodiments disclosed herein, the decision device 140, the determination device 150, the determination device 160, and the driving controller 170 are hardware devices and connected as separate devices to or may be embedded in the controller 110. In addition, the engine operation control apparatus 100 and/or elements thereof can be implemented using one or more processors coupled to a memory (or other non-transitory machine readable recording medium) storing computer-executable instructions for causing the processor(s) to perform the functions described above including the functions described in relation to the decision device 140, the determination device 150, the determination device 160, and the driving controller 170.

Figure 4A:
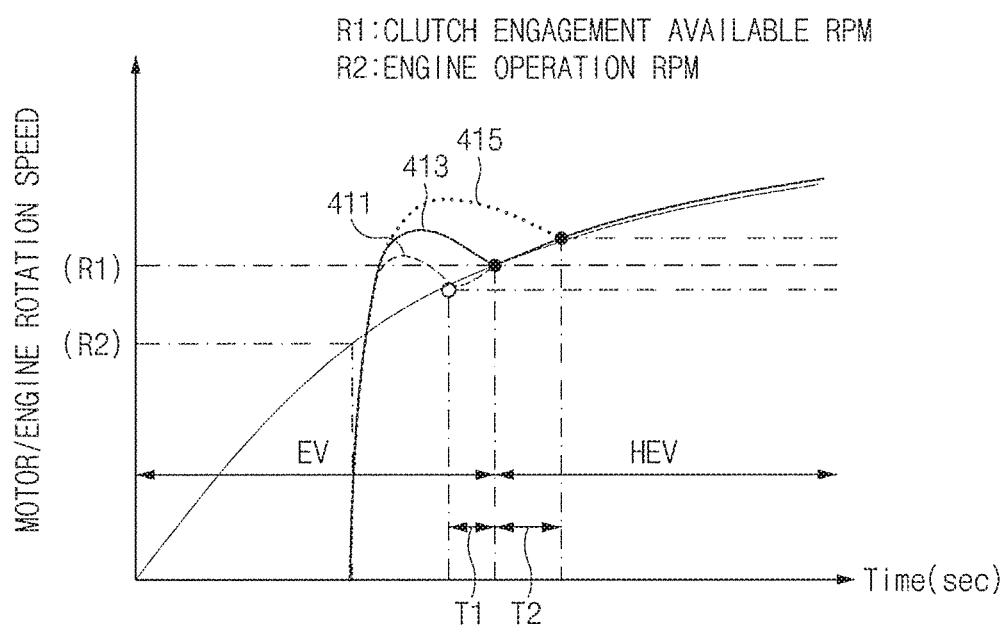

FIG. 4A is a graph showing an operation of the engine 10 with respect to an engine operation time point that is fixed.

Referring to FIG. 4A, graphs represented by reference numerals 411, 413, and 415 show variations in RPM of the engine 10 operated at a time point at which the motor RPM becomes R2. According to the graph represented by the reference numeral 413, it is verified that the RPM of the engine 10 is synchronized with the RPM of the motor 20 at the RPM R1 at which the engagement of the engine clutch 30 is available.

Meanwhile, according to the graph represented by the reference numeral 411, it is verified that the RPM of the engine 10 is synchronized with the RPM of the motor 20 before the RPM R1 at which the engagement of the engine clutch 30 is available. In this case, the engine 10 is operated in the idle state during a time T1 in which the RPM of the engine 10 becomes R1 after the engine 10 is synchronized with the motor 20.

Here, a fuel efficiency is greatly deteriorated depending on the engine idling section. This will be described with reference to FIGS. 5A and 5B.

Figure 5A:
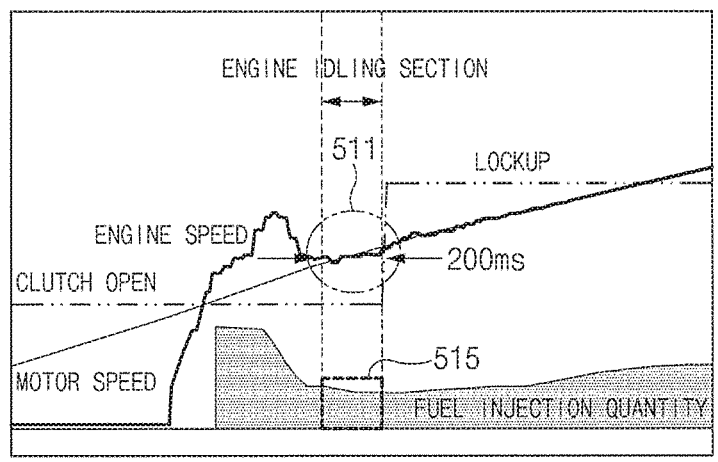

As shown in FIG. 5A, when the RPM of the engine 10 is synchronized with the RPM of the motor 20 before the RPM R1 at which the engagement of the engine clutch 30 is available, the engine 10 is operated in the engine idle state during a section represented by a reference numeral 511. Accordingly, a fuel is further consumed as a section represented by a reference numeral 515.

As an example, when assuming that the engine idling section is about 200 ms, the engine operation control apparatus 100 is required to operate the engine 10 in the engine idle state during about 6.3 seconds as shown in FIG. 5B, and in this case, a total fuel consumption amount in the engine idling section is about 3.9 mL. Accordingly, the fuel of about 3.9 mL is further consumed when compared with the graph represented by the reference numeral 413 shown in FIG. 4A.

In addition, according to the graph represented by the reference numeral 415, it is verified that the RPM of the engine 10 is synchronized with the RPM of the motor 20 after exceeding the RPM R1 at which the engagement of the engine clutch 30 is available. In this case, since the engine 10 is synchronized with the motor 20 after the R1, an operation time of the EV mode increases by a time T2 after R1.

Figure 4B:
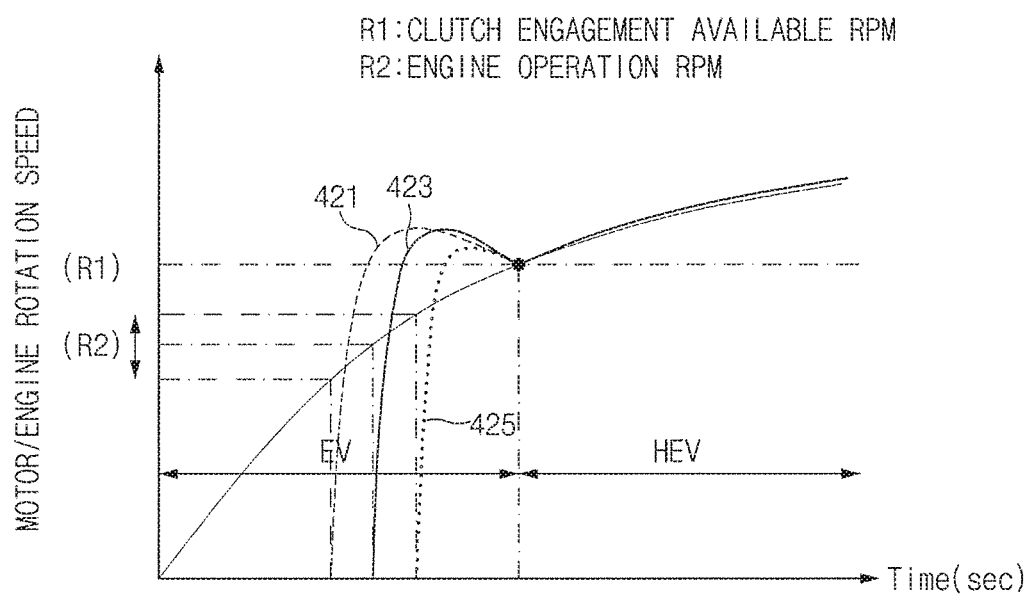

Accordingly, the engine operation control apparatus 100 learns the engine operation time point based on a difference value between the RPM R1 and each of the graphs represented by the reference numerals 411 and 415. In a case that the engine 10 operates based on the learned engine operation time point, the engine operation control apparatus 100 allows the engine 10 to be synchronized with the motor 20 at the RPM R1 or an RPM near to the RPM R1 as shown by the graphs 421 and 425 of FIG. 4B. This will be described with reference to FIGS. 6A and 6B.

Figure 6A:
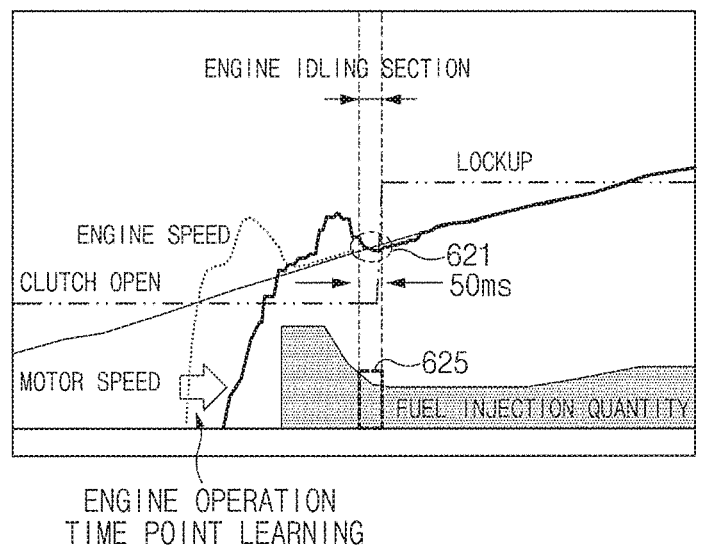

As shown in FIG. 6A, in a case that the engine operation control apparatus 100 operates the engine 10 at the learned engine operation time point, the difference between the RPM at the speed synchronization time point of the engine 10 and the motor 20 and the RPM at which the engagement of the engine clutch 30 is available decreases, and thus the engine idling section may decrease as compared with the engine idling section shown in FIG. 5A as represented by a reference numeral 621.

In this case, the fuel consumption amount as represented by a reference numeral 625 may decrease as compared with the fuel consumption amount as represented by a reference numeral 515 in FIG. 5A.

As an example, when assuming that the engine idling section is about 50 ms, the engine operation control apparatus 100 is required to operate the engine 10 in the engine idle state during about 4.1 seconds as shown in FIG. 6B, and in this case, a total fuel consumption amount in the engine idling section is about 2.6 mL. As described above, when the engine idling section becomes narrower, i.e., when the engine idling section decreases by about 2 seconds as compared with that shown in FIG. 5A, and the fuel consumption amount decreases by about 1.3 mL, and thus the fuel efficiency may increase by about 0.15%.

As described above, the engine operation control apparatus 100 according to the exemplary embodiment of the present disclosure determines the engine operation time point based on the learned value, and thus the engine idling section may be minimized. In addition, the time in which the engine 10 operates in the EV mode while exceeding the motor RPM at which the engagement of the engine clutch 30 is available may be minimized, and thus the fuel efficiency may be improved.

The engine operation control apparatus 100 operated as described above according to the present embodiment may be implemented in one independent hardware including a memory and a processor processing each operation and driven as a hardware while being included in other hardware, e.g., a microprocessor or a general-purpose computer system.

Hereinafter, an operation of the engine operation control apparatus having the above-mentioned configurations according to the present disclosure will be described in detail.

Figure 7:
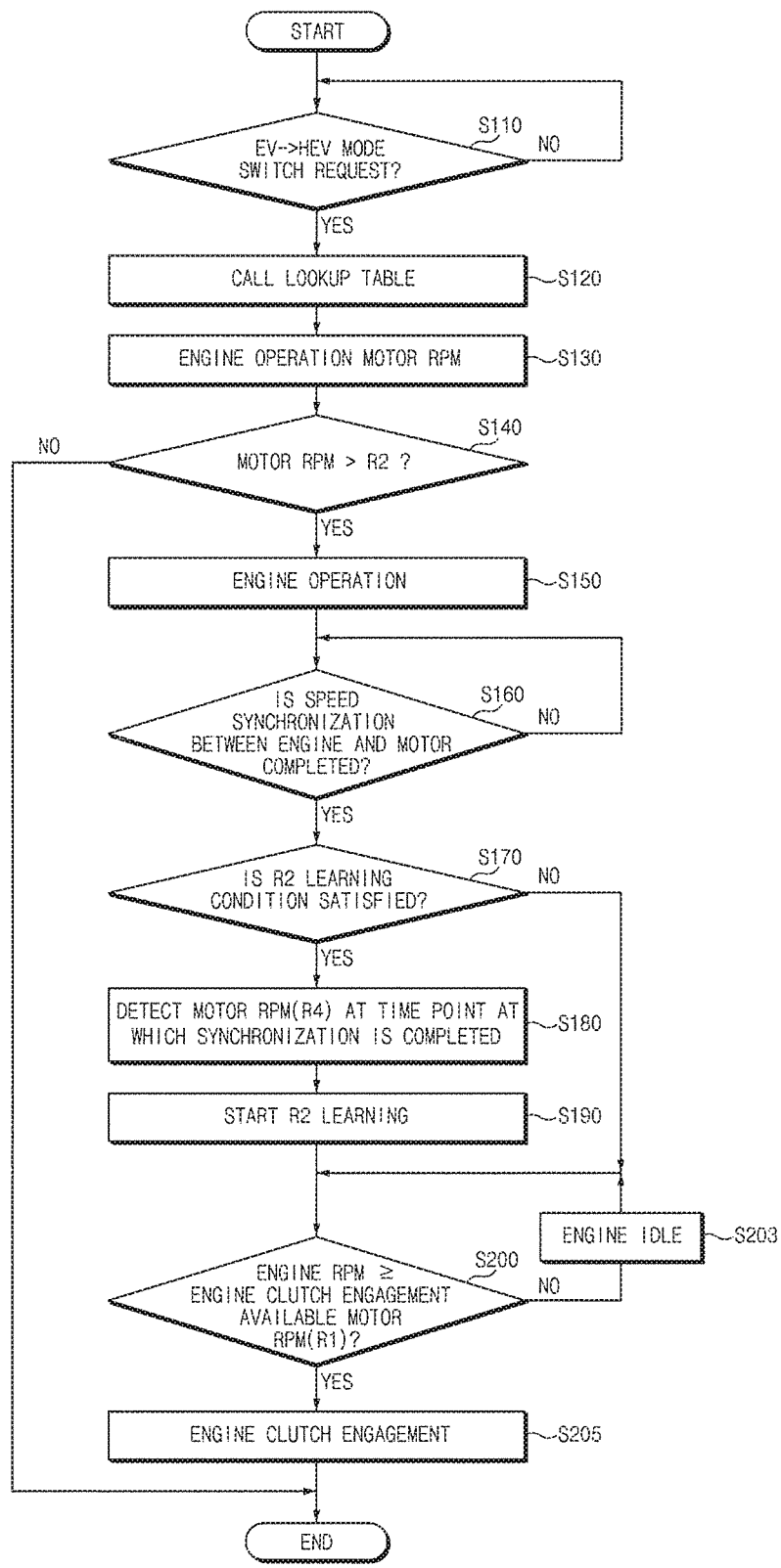
FIG. 7 is a flowchart illustrating an operation of an engine operation control method according to an exemplary embodiment of the present disclosure.

FIG. 7 is a flowchart illustrating an operation of an engine operation control method according to an exemplary embodiment of the present disclosure.

Referring to FIG. 7, when the EV mode is requested to be switched to the HEV mode (S110), the engine operation control apparatus 100 calls the lookup table in which the learning value that is previously learned is stored (S120) and determines the RPM R2 at the engine operation time point based on the learning value stored in the called lookup table (S130).

When the RPM R2 at the engine operation time point, which is determined in operation S130, is smaller than a present motor RPM (S140), the engine operation control apparatus 100 operates the engine 10 (S150). When the RPM R2 at the engine operation time point, which is determined in operation S130, is not smaller than the present motor RPM (S140), the engine operation control apparatus 100 terminates operations related operations.

When the synchronization in speed (RPM) between the engine 10 and the motor 20 is completed after the engine 10 operates in operation S150 (S160), the engine operation control apparatus 100 determines whether the learning condition with respect to the RPM R2 of the engine operation time point is satisfied at the time point at which the synchronization is completed (S170).

As an example, the engine operation control apparatus 100 may determine whether the first condition, in which the engine coolant temperature exceeds the reference temperature T1 at the time point at which the synchronization is completed, is satisfied in operation S170 and may determine whether the second condition, in which the HSG available power exceeds the reference power P at the time point at which the synchronization is completed, is satisfied in operation S170. When both the first condition and the second condition are satisfied, the engine operation control apparatus 100 may determine that the learning condition with respect to the RPM R2 of the engine operation time point is satisfied.

When it is verified that the lea condition with respect to the RPM R2 of the engine operation time point is satisfied in operation S170, the engine operation control apparatus 100 detects the motor RPM R4 at the time point at which the synchronization in speed between the engine 10 and the motor 20 is completed (S180) and starts learning with respect to the RPM R2 at the engine operation time point (S190).

The learning operation with respect to the RPM R2 at the engine operation time point will be described with reference to FIG. 8.

Figure 8:
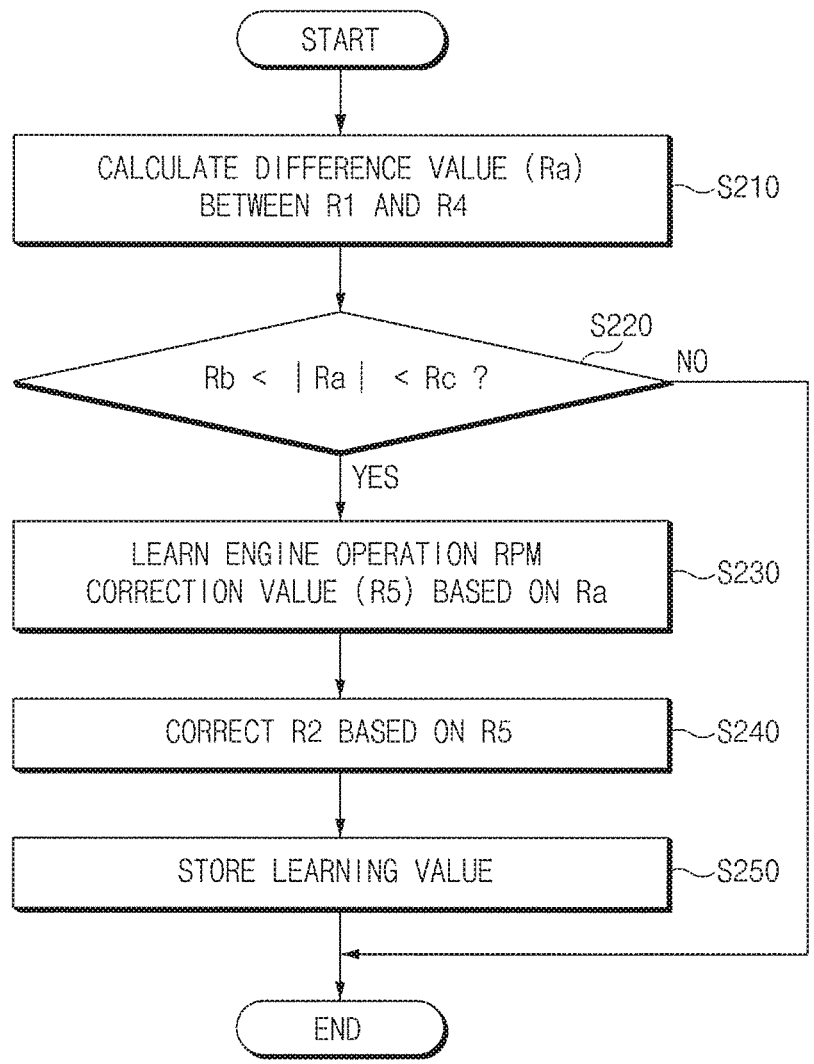
FIG. 8 is a flowchart illustrating an operation of an engine operation time point determining method of an engine operation control apparatus according to an exemplary embodiment of the present disclosure.

As shown in FIG. 8, when the learning with respect to the RPM R2 at the engine operation time point starts, the engine operation control apparatus 100 calculates the difference value Ra between the motor RPM R1 at which the engagement of the engine clutch 30 is available and the motor RPM R4 at the time point at which the synchronization is completed, which is detected in operation S180 (S210).

In the case that the absolute value of the difference value Ra calculated in operation S210 is equal to or smaller than the preset minimum value Rb or is equal to or greater than the preset maximum value Rc (S220), the engine operation control apparatus 100 terminates the learning with respect to the RPM R2 at the engine operation time point.

Meanwhile, in the case that the absolute value of the difference value Ra exceeds the minimum value Rb and is smaller than the maximum value Rc (S220), the engine operation control apparatus 100 learns the engine operation RPM correction value R5 based on the calculated difference value Ra (S230).

The learning of the engine operation RPM correction value R5 refers to Equation 3 described above.

Then, the engine operation control apparatus 100 compensates for the RPM R2 of the engine operation time point based on the engine operation RPM correction value R5 learned in operation S230 (S240) and stores the learning value in the lookup table (S250).

The engine operation control apparatus 100 compares the present engine RPM with the motor RPM R1 at which the engagement of the engine clutch 30 is available during the learning operation of the engine operation time point shown in FIG. 8. When it is verified that the present engine RPM is equal to or greater than the motor RPM R1 at which the engagement of the engine clutch 30 is available according to the compared result (S200), the engine operation control apparatus 100 engages the engine clutch 30 (S205) to allow the EV mode to be switched to the HEV mode.

When it is verified that the present engine RPM is smaller than the motor RPM R1 at which the engagement of the engine clutch 30 is available according to the compared result (S200), the engine operation control apparatus 100 operates the engine in the idling state (S203). However, the engine operation time point is determined based on the learning value in operation S130, the engine idling section may gradually decrease compared with before the learning operation.

Meanwhile, although the learning condition with respect to the RPM R2 of the engine operation time point is not satisfied in operation S170, the engine operation control apparatus 100 performs operation S200.

Figure 9:
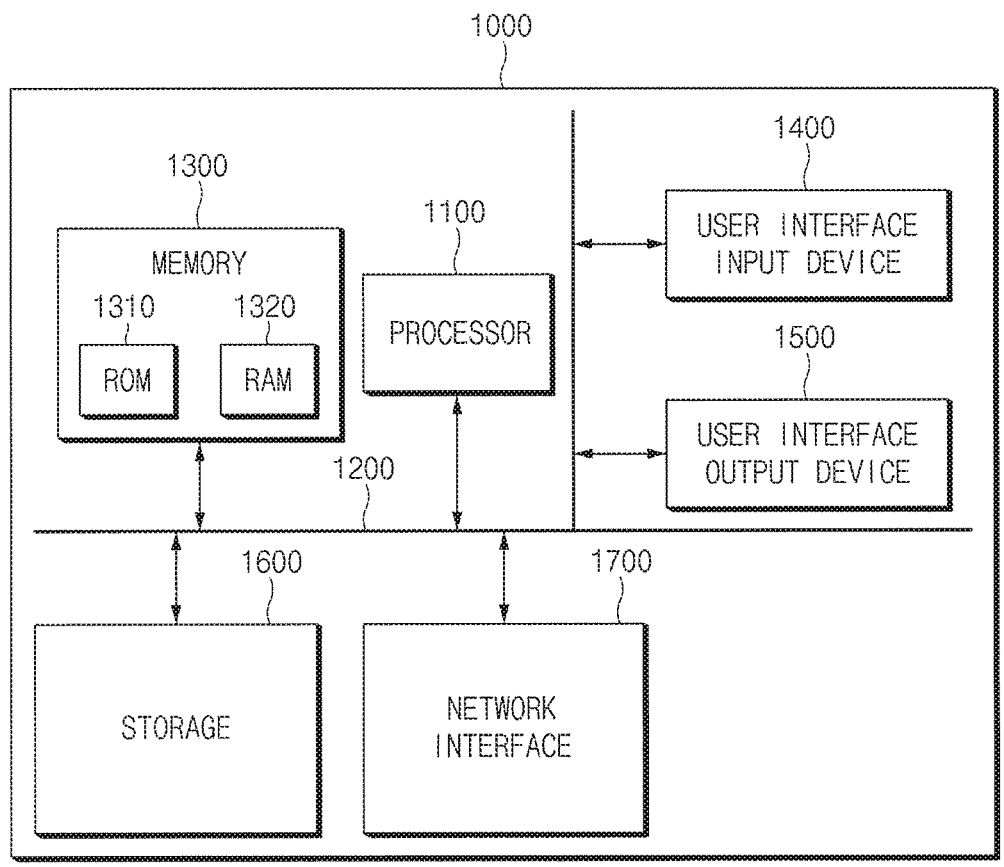
FIG. 9 is a block diagram illustrating a configuration of a computing system that executes an engine operation control method according to an exemplary embodiment of the present disclosure.

FIG. 9 is a block diagram illustrating a configuration of a computing system that executes an engine operation control method according to an exemplary embodiment of the present disclosure.

Referring to FIG. 9, the computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. Each of the to memory 1300 and the storage 1600 may include various types of volatile or non-volatile storage media. For example, the memory 1300 may include a read only memory (ROM) and a random access memory (RAM).

Thus, the operations of the methods or algorithms described in connection with the embodiments disclosed in the specification may be directly implemented with a hardware module, a software module, or combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM). The storage medium may be coupled to the processor 1100. The processor 1100 may read out information from the storage medium and may write information in the storage medium. Alternatively, the storage medium may be integrated with the processor 1100. The integrated processor and storage medium may reside in an application specific integrated circuit (ASIC). The ASIC may reside in a user terminal. Alternatively, the integrated processor and storage medium may reside as a separate component in the user terminal.

While the present disclosure has been described with reference to exemplary embodiments, it will be apparent to those skilled in the art that various changes and modifications may be made without departing from the spirit and scope of the present disclosure.

Therefore, exemplary embodiments of the present disclosure are not limiting, but illustrative, and the spirit and scope of the present disclosure is not limited thereto. The spirit and scope of the present disclosure should be interpreted by the following claims, and it should be interpreted that all technical ideas which are equivalent to the present disclosure are included in the spirit and scope of the present disclosure.

What is claimed is:

1. An engine operation control apparatus comprising a controller configured to:
    determine an engine operation start time point based on a lookup table in which a determination value, which is previously determined, is stored when a request to switch from electric vehicle (EV) mode to a hybrid electric vehicle (HEV) mode is received;
    determine whether to engage an engine clutch by comparing an engine revolutions per minute (RPM), when a speed of an engine operated at the engine operation start time point is synchronized with a speed of a motor, with a first motor RPM at which engagement of the engine to clutch is available;
    operate the engine at the engine operation start time point and control the engagement of the engine clutch depending on a determination result of engagement of the engine clutch; and
    store the engine operation start time point based on a second motor RPM at a synchronization completion time point when a determining condition with respect to the engine operation start time point is satisfied while the speed of the engine is synchronized with the speed of the motor.

2. The engine operation control apparatus of claim 1, wherein the controller determines the engine operation start time point when a first condition in which an engine coolant temperature exceeds a reference temperature and a second condition in which a hybrid starter generator (HSG) available power exceeds a reference power are satisfied.

3. The engine operation control apparatus of claim 1, wherein the controller is further configured to:
    calculate a difference value between the first motor RPM and the second motor RPM;
    determine whether the difference value is within a reference range; and
    determine an RPM correction value at the engine operation start time point based on the difference value according to a determined result of the difference value.

4. The engine operation control apparatus of claim 3, wherein the controller is further configured to determine that the difference value is within the reference range when an absolute value of the difference value exceeds preset minimum value and is smaller than preset maximum value.

5. The engine operation control apparatus of claim 4, wherein the minimum value is set based on a difference in speed control time between the engine and the motor.

6. The engine operation control apparatus of claim 4, wherein the maximum value is set based on a difference in an engine start peak RPM.

7. The engine operation control apparatus of claim 3, wherein the controller is further configured to:
    request the RPM correction value at the engine operation start time point, which is stored in the lookup table;
    add a value corresponding to a predetermined ratio of the difference value to the RPM correction value; and
    determine a new RPM correction value.

8. The engine operation control apparatus of claim 3, wherein the controller is further configured to store the new RPM correction value in the lookup table.

9. The engine operation control apparatus of claim 7, wherein the predetermined ratio is determined based on the determination value that is previously determined.

10. The engine operation control apparatus of claim 1, wherein the lookup table stores the first motor RPM determined depending on a slope of a road and an accelerator pedal sensor (APS), a first RPM correction value depending on a rate of change in the motor RPM, and a second RPM correction value corresponding to an RPM correction value determined by the controller.

11. The engine operation control apparatus of claim 10, wherein the controller is further configured to determine a motor RPM at the engine operation start time point based on the first motor RPM, the first RPM correction value, and the second RPM correction value, which are stored in the lookup table.

12. An engine operation control method comprising steps of:
   determining, by a controller, an engine operation start time point based on a lookup table in which a determination value, which is previously determined, s stored when a request to switch from an EV mode to an HEV mode is received;
   operating, by the controller, an engine at the engine operation start time point;
   storing, by the controller, the engine operation start time point based on a second motor RPM at a synchronization completion start time point when a determination condition with respect to the engine operation start time point is satisfied while a speed of the engine is synchronized with a speed of a motor;
   comparing, by the controller, an engine RPM when the speed of the engine is synchronized with the speed of the motor with a first motor RPM at which engagement of the engine clutch is available to determine to engage the engine clutch; and
   controlling, by the controller, engagement of the engine clutch depending on the determination.

13. The method of claim 12, wherein the step of storing comprises determining whether a first condition in which an engine coolant temperature exceeds a reference temperature and a second condition in which an HSG available power exceeds a reference power are satisfied.

14. The method of claim 12, further comprising steps of:
   calculating, by the controller, a difference value between the first motor RPM and the second motor RPM when step of storing the engine operation start time point starts;
   determining, by the controller, whether the difference value is within a reference range; and
   determining, by the controller, an RPM correction value at the engine operation start time point based on the difference value according to a determined result of the difference value.

15. The method of claim 14, wherein the step of determining the difference value comprises determining that the difference value is within the reference range when an absolute value of the difference value exceeds preset minimum value and is smaller than preset maximum value.

16. The method of claim 14, wherein the step of determining the correction value comprises:
   requesting the RPM correction value at the engine operation start time point, which is stored in the lookup table;
   adding a value corresponding to a predetermined ratio of the difference value to the requested RPM correction value; and
   learning a new RPM correction value.

17. The method of claim 14, further comprising a step of storing the determined RPM connection value in the lookup table.

18. The method of claim 12, wherein the lookup table stores the first motor RPM determined depending on a slope of a road and an accelerator pedal sensor (APS), a first RPM correction value depending on a rate of change in the motor RPM, and a second RPM correction value corresponding to a RPM correction value.

19. The method of claim 18, wherein the step of determining the engine operation start time point comprises determining a motor RPM at the engine operation start time point based on the first motor RPM, the first RPM correction value, and the second RPM correction value, which are stored in the lookup table.

20. The method of claim 12, wherein the step of determining engagement of the engine clutch comprises:
   determining to engage the engine clutch when the engine RPM at the synchronization time point is equal to or greater than the first motor RPM; and
   determining to operate the engine in an idling state when the engine RPM at the synchronization time point is smaller than the first motor RPM.

\* \* \* \* \*